J. C. CORDERMAN.
CORN HARVESTER.
APPLICATION FILED JULY 25, 1910.

982,798.

Patented Jan. 31, 1911.
2 SHEETS—SHEET 1.

Witnesses.
Harry Opsahl.
A. H. Opsahl.

Inventor:
John C. Corderman
By his Attorneys.
Williamson  Merchant

THE NORRIS PETERS CO., WASHINGTON, D. C.

J. C. CORDERMAN.
CORN HARVESTER.
APPLICATION FILED JULY 25, 1910.
982,798.
Patented Jan. 31, 1911.
2 SHEETS—SHEET 2.
Fig. 3
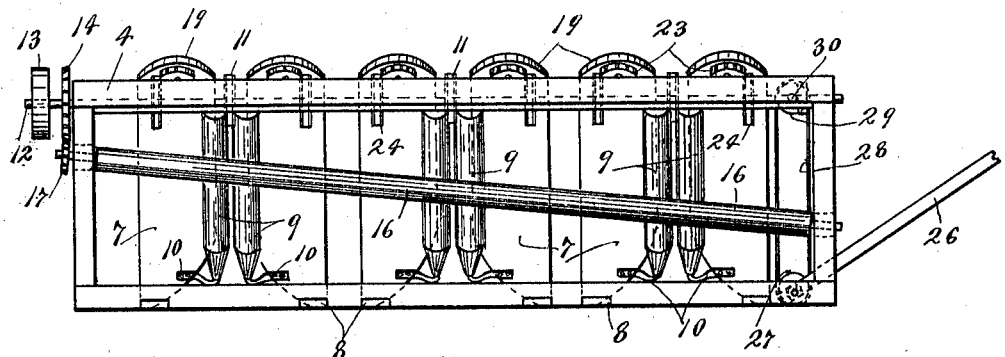
Fig. 4
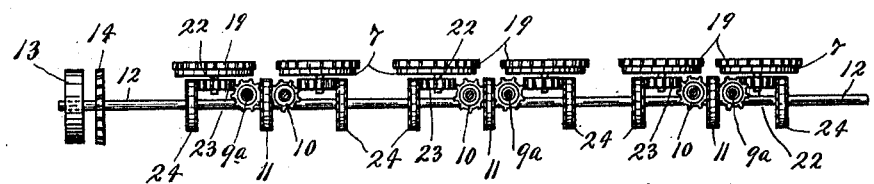
Fig. 5
Fig. 6
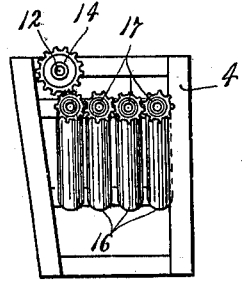
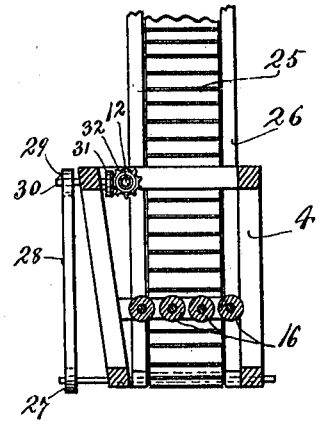
Witnesses.
Harry Opsahl.
A. H. Opsahl.
Inventor.
John. C. Corderman
By his Attorneys.
Williamson Merchant

UNITED STATES PATENT OFFICE.

JOHN C. CORDERMAN, OF APPLETON, MINNESOTA.

CORN-HARVESTER.

982,798.

Specification of Letters Patent. Patented Jan. 31, 1911.

Application filed July 25, 1910. Serial No. 573,741.

*To all whom it may concern:*

Be it known that I, JOHN C. CORDERMAN, a citizen of the United States, residing at Appleton, in the county of Swift and State of Minnesota, have invented certain new and useful Improvements in Corn-Harvesters; and I do hereby declare the following to be a full, clear, and exact description of the invention, such as will enable others skilled in the art to which it appertains to make and use the same.

My invention has for its object to provide an improved corn harvester adapted to snap the ears of corn from the standing stalks, without cutting the stalks, and to deliver the ears into a suitable receptacle, preferably, into the box of a wagon driven at the side of the machine. Preferably, the mechanism includes, also, means for husking the ears immediately after they are snapped from the stalks.

The invention consists of the novel devices and combinations of devices hereinafter described and defined in the claims.

In the acompanying drawings which illustrate the invention, like characters indicate like parts throughout the several views.

Figure 1:
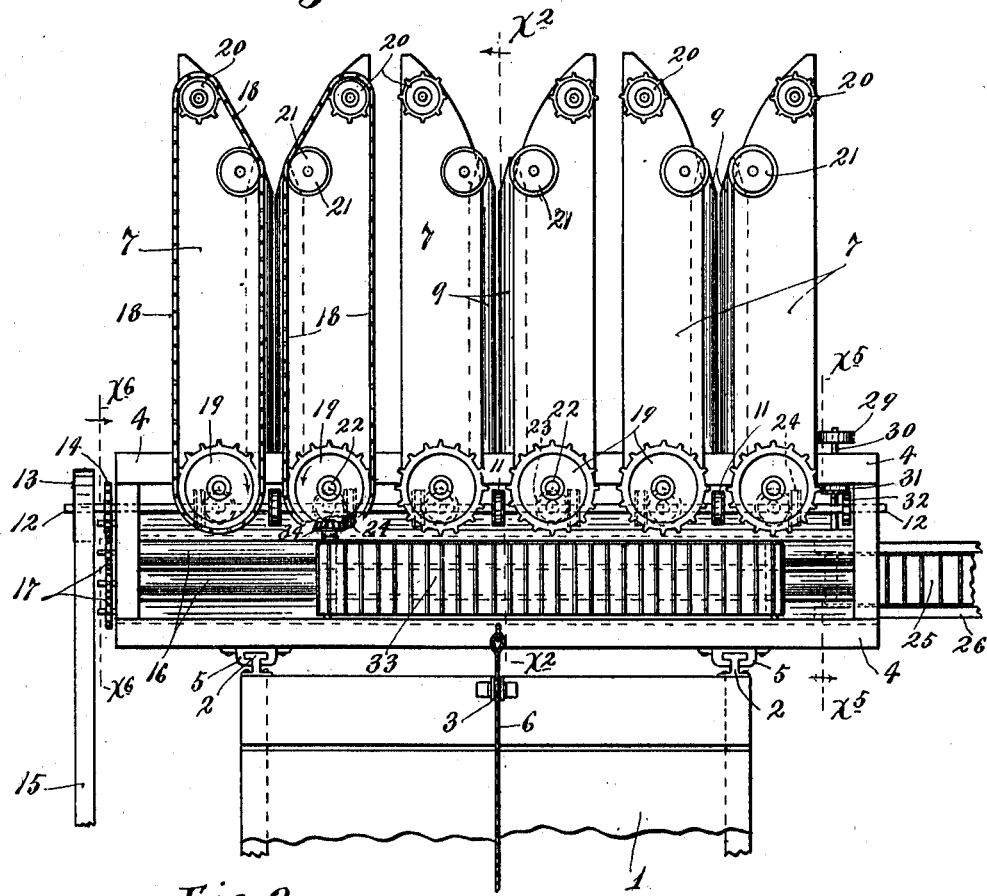
Figure 2:
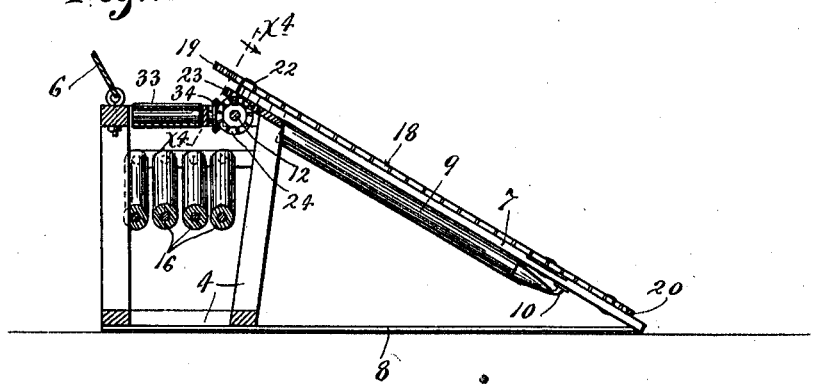

Referring to the drawings: Figure 1 is a plan view, with some parts broken away, illustrating the invention; Fig. 2 is a vertical section taken on the line $x^2$ $x^2$ of Fig. 1 showing the harvester mechanism removed from the truck of the machine; Fig. 3 is a rear elevation of the parts shown in Fig. 2; Fig. 4 is a transverse section taken on the line $x^4$ $x^4$ of Fig. 2, some parts being removed, the said view being intended to show the driving gears for the snapping rollers and the delivery chains; Fig. 5 is a vertical section taken on the line $x^5$ $x^5$ of Fig. 1 some parts being broken away, and Fig. 6 is a section taken approximately on the line $x^6$ $x^6$ of Fig. 1, some parts being removed.

In Fig. 1, the numeral 1 indicates the front portion of the heavy truck frame, such for instance as the frame of a traction engine, or of a supporting truck pushed by horses hitched at the rear thereof. On its front end portion the truck frame 1 is provided with vertically extended rigidly secured T rails 2, and at its central front portion the said truck frame is shown as provided with a guide sheave 3.

The frame work of the corn harvester attachment is an open approximately rectangular structure and is indicated as an entirety by the numeral 4. At its rear portion, the harvester frame 4 is provided with rigidly secured channel shape guides 5 that are interlocked with but slide vertically upon the T rails 2 of the truck frame 1, thus supporting the harvester frame from the said truck frame with freedom for vertical adjustment. Such vertical adjustment may be produced in various ways but, as shown, is accomplished by a cable 6 passed over the guide sheave 3, attached at its lower end to the harvester frame 4 and extended at its other end to a suitable windlass drum, not shown, but which would be located on the harvester frame.

This improved corn harvester may be arranged to simultaneously operate on any desired number of rows of corn, and, as shown in the drawings, will operate simultaneously upon three rows. Hence, for operation upon each row of corn there is provided a pair of forwardly inclined gathering devices shown as in the form of gathering plates 7, the lower front ends of which rearwardly converge so that they will properly gather the corn stalks and direct the same between the adjacent inner edges of the coöperating gathering plates. At their upper portions the gathering plates 7, as shown, are rigidly secured to the front transverse top bar of the frame 4, and at their lower portions, they are rigidly connected to brace bars 8, the rear ends of which are rigidly secured to the bottom of the said frame 4.

Located below the gap formed between each pair of gathering plates 7 is a pair of forwardly and downwardly inclined snapping rollers 9 the lower front ends of which are made conical and are connected by suitable cone bearings to small bearing brackets 10 secured on the front end portions of the said gathering plates. The upper ends of the shafts $9^a$ of the snapping rollers 9 (see Fig. 4) are journaled in suitable bearings on the upper portion of the frame 4 and are provided with pinions 10 that mesh in pairs with double faced gears 11 carried by a long transverse counter shaft 12, mounted in suitable bearings on frame 4 and provided at one end, to-wit, as shown at its left hand end, with a pulley 13 and a gear 14. Motion is imparted to the counter shaft 12 from the belt 15 which runs over the pulley 13 and may be driven either by an engine carried on the truck frame 1 or by traction wheels of the operating truck.

Extended transversely of the machine below and at the rear of the counter shaft 12 is a plurality of parallel husking rollers 16 which, as shown, incline in a direction from the left downwardly toward the right hand side of the machine and are journaled in suitable bearings on the frame 4. These husking rollers 16 may be provided with husking pins, if desired, and their shafts at the left hand side of the machine are provided with intermeshing gears 17, one of which meshes with the gear 14 of the counter shaft 12.

Extending along the marginal portions of the so-called gathering plates 7 and located above the same, are feed belts, preferably in the form of sprocket chains 18. These sprocket chains 18 are arranged to run over an upper sprocket 19, lower sprocket 20, and intermediate guide wheels 21. The lower sprockets 20 are loosely journaled to the lower portions of the gathering plates 7, and the wheels 21 are loosely journaled to the said gathering plates in the vicinity of the lower portions of their straight inner edges. The sprockets 19 are journaled to the upper portions of the gathering plates 7 and are secured to short shafts 22, to the lower ends of which pinions 23 are secured. These pinions 23 mesh with gears 24 carried by the counter shaft 12, already described.

The lower ends of the inclined husking rollers 16 are arranged to deliver on to an inclined endless elevator belt 25, mounted in a supporting frame 26 suitably supported from the frame 4. The inner and lower portion of the elevator belt 25 runs over an ordinary driving roller, the shaft of which is mounted in suitable bearings on the frame 4 and is provided with a pulley 27 at its front end (see Figs. 3 and 5). A belt 28 runs over the pulley 27, and over a pulley 29 secured on the front end of a short shaft 30 mounted in suitable bearings on frame 4. This shaft 30 is provided with a gear 31 that meshes with a gear 32, carried by the counter shaft 12. Thus the elevator 25 is driven from said counter shaft 12.

Horizontal transversely extended endless carrier belt 33 is arranged to work over nearly all but the left hand portions of the husking rollers 16. This belt 33 is arranged to run over suitable guide rollers, not shown, but which are mounted in bearings on the upper portion of the frame 4, and one of which rollers is provided with a bevel gear 34 that meshes with one of the bevel gears 24, carried by the counter shaft 12, as shown in Figs. 1 and 2.

The operation of the machine is substantially as follows: When the machine is driven forward the standing corn stalks will be gathered or collected by the converging ends of the gathering plates 7 and will be directed between inclined snapping rollers 9 and between the upwardly and rearwardly moving portions of the coöperating feed belts or chains 18. The stalks will not be cut or pulled out of the ground, but under the forward movement of the machine, they will be pulled downward and forward and between the inclined pairs of snapping rollers 9, and the latter will snap the unhusked ears from the stalks, and by the said feed chains, these ears will be fed upwardly and rearwardly. The ears which are carried by the intermediate and right hand belts 18 will be delivered on to the carrier belt 33, and by the latter will be delivered on to the upper portions of the husking rollers 16, while the ears fed by the left hand belts 18 will be delivered directly on to the upper ends of said husking rollers. The husking rollers will tear the husks from the ears and feed the same downward, while the husked ears will roll or work their way downward on husking rollers and will be delivered to the elevator belt 25, and by the latter may be delivered into the box of a wagon driven at the side of the machine.

The entire corn harvester may be adjusted vertically to adapt the machine to different positions of the standing corn. The tapered lower front ends of the snapping rollers make the entrance of the stalks between the rollers an easy matter. The so-called gathering plates may take various forms, and, in fact, the term gathering plates is used in a broad sense and, for convenience. It is not limited to the flat or solid form thereof.

What I claim is:—

1. In a corn harvester, the combination with a multiplicity of pairs of forwardly and downwardly inclined snapping rollers and feed devices coöperating therewith, of transversely inclined husking rollers having their upper ends located immediately below the delivery ends of one set of said snapping rollers and said feed devices and arranged to receive at their upper ends from one set of snapping and feed devices, and a conveyer arranged to receive from another set of snapping and feed devices and to deliver the ears to the upper portions of said husking rollers, substantially as described.

2. In a corn harvester, the combination with a transversely extended frame and a counter shaft journaled thereon, of a multiplicity of pairs of forwardly and downwardly inclined gathering plates having diverging front end portions, corresponding pairs of forwardly and downwardly inclined snapping rollers having divergent front ends and mounted to work immediately below the inner edges of said gathering plates, pairs of endless gathering belts working immediately over said gathering plates and having diverging front portions, transversely inclined husking rollers journaled in said frame and having their upper ends located below the delivery ends of said snapping rollers and said gathering belts, an endless carrier belt working over said husking rollers and arranged to receive from all but one pair of said feed belts and to deliver the ears on the upper end portions of said husking rollers, the other pair of feed belts being arranged to deliver directly on to the upper end portions of said husking rollers, and connections from said counter shaft for driving the said snapping rollers, husking rollers, feed belts, and carrier belt, substantially as described.

In testimony whereof I affix my signature in presence of two witnesses.

JOHN C. CORDERMAN.

Witnesses:
HENRY LENDE,
H. S. LEIEDSECH.